(12) United States Patent
Huang et al.

(10) Patent No.: US 11,690,146 B2
(45) Date of Patent: Jun. 27, 2023

(54) MICROWAVE SEPARATED FIELD RECONSTRUCTED (SFR) DEVICE FOR PERMITTIVITY AND PERMEABILITY MEASUREMENT

(71) Applicant: Sichuan University, Sichuan (CN)

(72) Inventors: Kama Huang, Sichuan (CN); Yi Zhang, Sichuan (CN); Yang Yang, Sichuan (CN); Huacheng Zhu, Sichuan (CN); Li Wu, Sichuan (CN); Bing Zhang, Sichuan (CN)

(73) Assignee: Sichuan University, Sichuan (CN)

( * ) Notice: Subject to any disclaimer, the term of this patent is extended or adjusted under 35 U.S.C. 154(b) by 670 days.

(21) Appl. No.: 16/808,376

(22) Filed: Mar. 4, 2020

(65) Prior Publication Data
US 2020/0205244 A1   Jun. 25, 2020

(30) Foreign Application Priority Data

Mar. 5, 2019   (CN) .......................... 201910164780.6
Mar. 5, 2019   (CN) .......................... 201910164794.8

(51) Int. Cl.
*H05B 6/70* (2006.01)
*H05B 6/80* (2006.01)
*H05B 6/68* (2006.01)
*G01N 22/00* (2006.01)

(52) U.S. Cl.
CPC ............. *H05B 6/686* (2013.01); *H05B 6/707* (2013.01); *G01N 22/00* (2013.01)

(58) Field of Classification Search
CPC ........ H05B 6/707; H05B 6/701; H05B 6/806; H05B 6/705; H05B 2206/044
See application file for complete search history.

(56) References Cited

U.S. PATENT DOCUMENTS

| | | | |
|---|---|---|---|
| 4,742,317 A * | 5/1988 | Thal, Jr. .................... | H01P 1/16 333/137 |
| 5,025,222 A * | 6/1991 | Scott .................. | G01N 33/2823 324/641 |
| 5,302,803 A * | 4/1994 | Stevens ............. | H01J 37/32229 219/121.41 |
| 5,455,516 A * | 10/1995 | Jean ....................... | G01N 22/04 324/636 |
| 5,467,021 A * | 11/1995 | Adamian ............. | G01R 35/005 324/650 |

(Continued)

*Primary Examiner* — Helena Kosanovic
*Assistant Examiner* — Lawrence H Samuels (57) ABSTRACT

A microwave separated field reconstructed device includes: a microwave field reconstructed cavity, a first short circuit plane, a third waveguide flange and coupling windows, wherein connection ports are provided on four ends of the microwave field reconstructed cavity; the microwave field reconstructed cavity is provided with a first waveguide flange, and a second waveguide flange is provided one end of the microwave field reconstructed cavity perpendicular to the first waveguide flange; the first short circuit plane is connected to one end of the first waveguide flange away from the microwave field reconstructed cavity; a second short circuit plane is connected to one end of the second waveguide flange away from the microwave field reconstructed cavity. The input ports are distributed at two ends of the microwave field reconstructed cavity to introduce electric and magnetic fields.

3 Claims, 5 Drawing Sheets

(56) References Cited

U.S. PATENT DOCUMENTS

| | | | | |
|---|---|---|---|---|
| 5,589,807 | A * | 12/1996 | Tang | H01P 1/2082 333/229 |
| 7,230,218 | B2 * | 6/2007 | Roussy | H05B 6/704 219/746 |
| 8,222,579 | B2 * | 7/2012 | Taguchi | H05B 6/701 219/745 |
| 8,462,350 | B2 * | 6/2013 | Pfaff | G01B 11/2441 356/457 |
| 9,374,853 | B2 * | 6/2016 | Adonyi | H05B 6/80 |
| 9,657,991 | B2 * | 5/2017 | Hallac | F27B 9/36 |
| 2007/0075072 | A1 * | 4/2007 | Roussy | H05B 6/72 219/695 |
| 2008/0272114 | A1 * | 11/2008 | Taguchi | H05B 6/707 219/690 |
| 2011/0031239 | A1 * | 2/2011 | Taguchi | H05B 6/707 219/745 |
| 2011/0132902 | A1 * | 6/2011 | Novak | H05B 6/701 219/690 |
| 2011/0290789 | A1 * | 12/2011 | Matsuzawa | H05B 6/806 219/696 |
| 2011/0298476 | A1 * | 12/2011 | Degerstrom | G01R 27/32 324/615 |
| 2014/0224789 | A1 * | 8/2014 | Adonyi | H05B 6/80 219/690 |
| 2016/0050722 | A1 * | 2/2016 | Fu | H05B 6/6402 219/745 |
| 2016/0095171 | A1 * | 3/2016 | Chaimov | H05B 6/6447 219/746 |

\* cited by examiner

MICROWAVE SEPARATED FIELD RECONSTRUCTED (SFR) DEVICE FOR PERMITTIVITY AND PERMEABILITY MEASUREMENT

CROSS REFERENCE OF RELATED APPLICATION

The present invention claims priority under 35 U.S.C. 119(a-d) to CN 201910164780.6, filed. Mar. 5, 2019; CN 201910164794.8, filed Mar. 5, 2019; CN 201910591500.X, filed Mar. 5, 2019.

BACKGROUND OF THE PRESENT INVENTION

Field of Invention

The present invention relates to a technical field of microwave energy, and more particularly to a microwave separated field reconstructed device, a chemical reactor and a characteristic system.

Description of Related Arts

At present, microwave energy has been widely used in materials processing, chemical reactions, measurement, detection, etc.

In recent years, microwave material processing using single-mode cavity has been proposed. In 2001, J. Cheng et at verified that electric field and magnetic field components of microwave have different temperature rise curves for different materials through experiments on processing powder materials in a microwave single-mode cavity. J. Cheng et al. further studied different mechanisms of electric field and magnetic field components of microwave for different materials. In 2013, J. Fukushima verified that both electric field and magnetic field components of microwave can reduce the activation energy of CuO reduction reaction through single-mode cavity experiment, and that the magnetic field center of microwave is more effective than the electric field center.

However, conventional research on the microwave separation field is mainly carried out through the electric field center and the magnetic field center in the single-mode cavity. In the single-mode cavity, the electric field center and the magnetic field center of the microwave are at different positions. Researchers have studied the different contributions of electric field and magnetic field components to the reaction by placing the reaction in the electric field center and the magnetic field center in the microwave cavity. However, to achieve more efficient microwave chemical reactions and microwave treatment of special (mixed, combined) materials, a specific proportion of electric field and magnetic field components in the reactants is needed. Furthermore, during the reaction, electric field and magnetic field components of the microwave in the reactants need to be real-time regulated. Meanwhile, in microwave performance test of materials, the permittivity and magnetic permeability of the materials need to be separated. However, the conventional microwave reactors and material microwave characteristic systems cannot control the electric field and magnetic field components of the microwave. In view of the shortcomings, the conventional microwave single-mode cavity separation field technology needs to be improved.

Therefore, the present invention proposes a microwave separated field reconstructed device.

SUMMARY OF THE PRESENT INVENTION

In view of the above defects of the prior art, an object of the present invention is to provide a microwave separated field reconstructed device, and further provide a chemical reactor and a material microwave performance characteristic system based on the above mechanism, thereby solving the above mentioned problem that it is conventionally difficult to achieve an arbitrary proportion of electric field and magnetic field components of microwave.

Accordingly, in order to accomplish the above objects, the present invention provides:

a microwave separated field reconstructed device, comprising: a microwave field reconstructed cavity, a first short circuit plane, a third waveguide flange and coupling windows, wherein connection ports are provided on four ends of the microwave field reconstructed cavity; the microwave field reconstructed cavity is provided with a first waveguide flange, and a second waveguide flange is provided one end of the microwave field reconstructed cavity perpendicular to the first waveguide flange; the first short circuit plane is connected to one end of the first waveguide flange away from the microwave field reconstructed cavity; a second short circuit plane is connected to one end of the second waveguide flange away from the microwave field reconstructed cavity; a third waveguide flange is provided on one end of the microwave field reconstructed cavity away from the first waveguide flange; a fourth waveguide flange is provided at one end of the microwave field reconstructed cavity away from the second waveguide flange input ports are provided at one end of the third waveguide flange and one end of the fourth waveguide flange; the coupling windows are provided between the input port of the third waveguide flange and the microwave field reconstructed cavity as well as between the input port of the fourth waveguide flange and the microwave field reconstructed cavity.

Preferably, included angles between the connection ports externally provided on the microwave field reconstructed cavity are 90°.

Preferably, the first short circuit plane and the microwave field reconstructed cavity form a detachable structure through the first waveguide flange.

Preferably, an external dimension of one end of the third waveguide flange matches an external dimension of the coupling windows, and the third waveguide flange is connected to one of the coupling windows by bolts.

Preferably, the microwave separated field reconstructed device further comprises a third short circuit plane and a fourth short circuit plane, wherein the third short circuit plane is directly connected to the microwave field reconstructed cavity; the fourth short circuit plane is directly connected to the microwave field reconstructed cavity.

Preferably, each of the third short circuit plane and the fourth short circuit plane has a port for connection of the coaxial cable.

Preferably, both the third short circuit plane and the fourth short circuit plane are connected to the microwave field reconstructed cavity by bolts.

Preferably, the microwave separated field reconstructed device further comprises assembly holes arranged on the microwave field reconstructed cavity for installing test tubes.

The present invention also provides a chemical reactor, comprising: a microwave separated field reconstructed device, wherein in a microwave field reconstructed cavity, a cavity between a first short circuit plane and a coupling window connected to a third waveguide flange constitutes a first resonant cavity, and a cavity between a second short circuit plane and a coupling window connected to a fourth waveguide flange constitutes a second resonant cavity; wherein the chemical reactor further comprises: a second microwave source, a first microwave source, a treatment sample, and a test tube, wherein the treatment sample is placed inside the test tube;

the second microwave source is connected to an input port of the third waveguide flange, and the first microwave source is connected to an input port of the fourth waveguide flange; the test tube is inserted into an overlapping part between the second resonant cavity and the first resonant cavity.

Preferably, a direction of a width side of a waveguide of the first resonant cavity is parallel to a direction of a narrow or width side of a waveguide of the second resonant cavity, in such a manner that microwave electric field directions in the first resonant cavity and the second resonant cavity are perpendicular or parallel to each other.

Preferably, the two resonant cavities in the chemical reactor simultaneously enable two electric field centers or two magnetic field centers at the test tube.

Preferably, an included angle between the first resonant cavity and the second resonant cavity is 90°.

Preferably, the first resonant cavity and the second resonant cavity form a detachable structure through a first waveguide flange.

Preferably, the chemical reactor further comprises a first coaxial cable and a second coaxial cable, wherein the microwave separated field reconstructed device further comprises a third short circuit plane and a fourth short circuit plane, wherein the third short circuit plane is directly connected to the microwave field reconstructed cavity; the fourth short circuit plane is directly connected to the microwave field reconstructed cavity;

the first coaxial cable connects a port for connection of the coaxial cable of the third short circuit plane and the second microwave source; the second coaxial cable connects a port for connection of the coaxial cable of the fourth short circuit plane and the first microwave source.

Preferably, the chemical reactor further comprises a first tuner and a second tuner, wherein the first tuner helps to match the field reconstructed device and the first coaxial cable, and the second tuner helps to match the field reconstructed device and the second coaxial cable.

Preferably, the chemical reactor further comprises assembly holes arranged on the microwave field reconstructed cavity for installing the test tube.

Preferably, both the third short circuit plane and the fourth short circuit plane are connected to the microwave field reconstructed cavity by bolts.

The present invention also provides a characteristic system based on a microwave separated field reconstructed device, comprising: a vector network analyzer, two coaxial cables, and two waveguide coaxial converters, wherein the two waveguide coaxial converters replace a first microwave source and a second microwave source, and are connected to an input port of a fourth waveguide flange and an input port of a third waveguide flange, respectively; the two coaxial cables are respectively connected to the two waveguide coaxial converters, and both are connected to the vector network analyzer.

Preferably, the vector network analyzer is electrically connected to the two waveguide coaxial converters through the two coaxial cables.

Preferably, a microwave separated field reconstructed device comprises a third short circuit plane and a fourth short circuit plane, wherein each of the third short circuit plane and the fourth short circuit plane has a port for connection of the coaxial cable.

Compared with the prior art, the microwave separated field reconstructed device, the chemical reactor and the characteristic system of the present invention have advantages such as good isolation of input feed sources, easy adjustment of cavity resonance frequency and mode, and the following beneficial effects.

1. The input ports are provided. The input ports are distributed at two ends of the microwave field reconstructed cavity to introduce electric and magnetic fields. At the junction of the microwave field reconstructed cavity, the reconstruction of the electric field and magnetic field of microwave is realized. The proportion of electric field intensity and magnetic field intensity of the microwave can be adjusted by adjusting input power of the two orthogonal ports.

2, The coupling window are provided. The coupling windows can be installed on the waveguide flanges with different waveguide lengths. By selecting waveguide of different waveguide lengths, the coupling windows are fixed at different positions, in such a manner that distances between the coupling windows and the short circuit planes are adjusted, thereby adjusting frequencies and characteristics of the resonant cavities formed by the microwave field reconstructed cavity.

3. The microwave field reconstructed cavity is provided. The microwave field reconstructed cavity is integrated, so that the included angles of the connection ports externally provided on the microwave field reconstructed cavity are all 90°. As a result, the resonant cavities formed by the microwave field reconstructed cavity are perpendicular to each other, improving the isolation between the two feed sources.

BRIEF DESCRIPTION OF THE DRAWINGS

wherein S parameter refers to scattering parameter.

DETAILED DESCRIPTION OF THE PREFERRED EMBODIMENT

In order to make the objects, technical solutions, and effects of the present invention clearer and more specific, the present invention is further described in detail below with the accompanying drawings and embodiments. The specific embodiments described herein are only used to explain the present invention and are not intended to be limiting.

Embodiment 1

Figure 1:
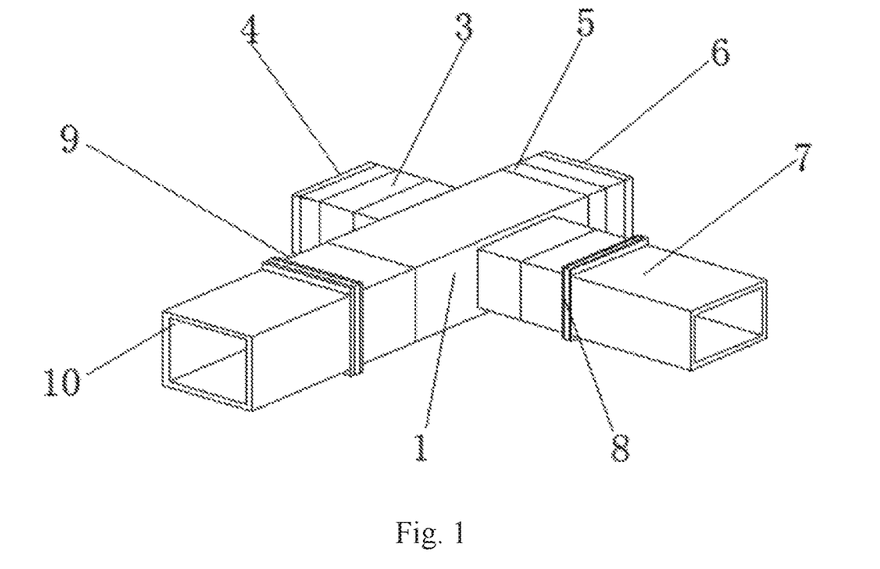
FIG. 1 is a perspective view of a separated field reconstructed device according to an embodiment 1 of the present invention.
Figure 2:
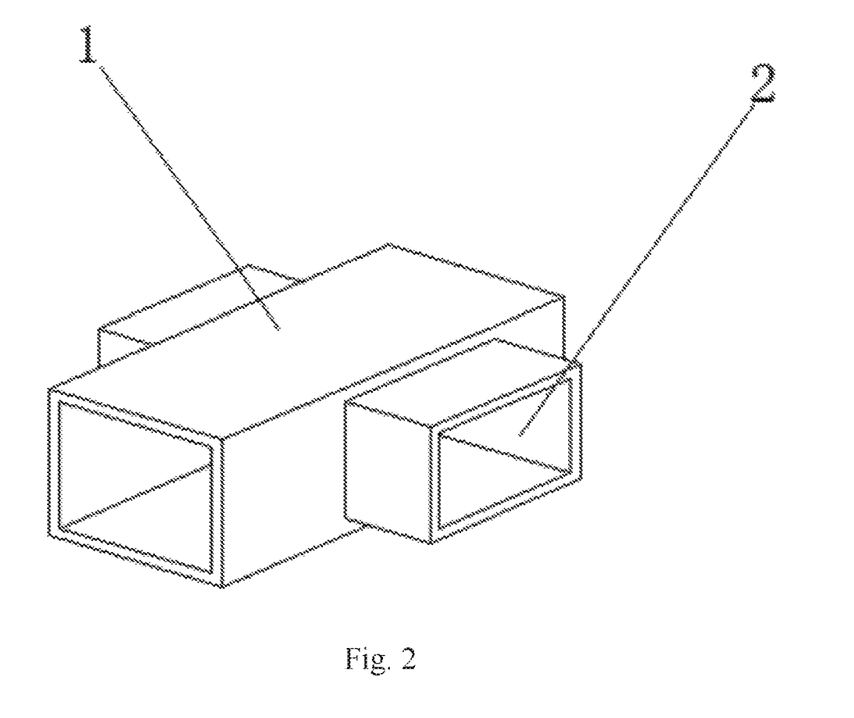
FIG. 2 is a structural view of a microwave field reconstructed cavity according to the embodiment 1 of the present invention.
Figure 3:
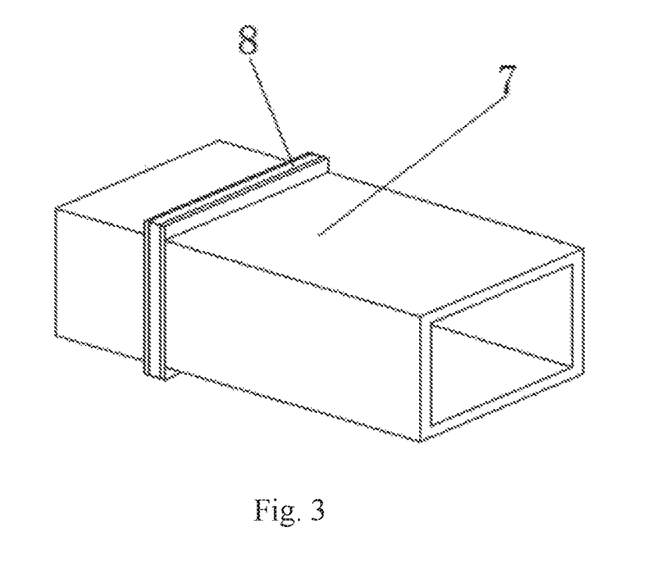
FIG. 3 is a structural view of a connection structure between a third waveguide flange and a coupling window according to the embodiment 1 of the present invention.

Referring to FIGS. 1-3, the present invention provides a microwave separated field reconstructed device, comprising: a microwave field reconstructed cavity 1, connection ports 2, a first waveguide flange 3, a first short circuit plane 4, a second waveguide flange 5, a second short circuit plane 6, a third waveguide flange 7, coupling windows 8, a fourth waveguide flange 9 and input ports 10, wherein the connection ports 2 are provided on four ends of the microwave field reconstructed cavity 1; included angles between the connection ports 2 externally provided on the microwave field reconstructed cavity 1 are 90°. The included angles of the connection ports 2 externally provided on the microwave field reconstructed cavity 1 are all 90°, so that the resonant cavities formed by the microwave field reconstructed cavity are perpendicular to each other, improving the isolation between the two feed sources. The microwave field reconstructed cavity 1 is provided with a first waveguide flange 3, and a second waveguide flange 5 is provided one end of the microwave field reconstructed cavity 1 perpendicular to the first waveguide flange 3; wherein the first short circuit plane 4 is connected to one end of the first waveguide flange 3 away from the microwave field reconstructed cavity 1, and the first short circuit plane 4 and the microwave field reconstructed cavity 1 form a detachable structure through the first waveguide flange 3. The first waveguide flange 3 is conducive to installing the first short circuit plane 4 to one side of the microwave field reconstructed cavity 1. Similarly, to install the second short circuit plane 6, the second short circuit plane 6 is connected to one end of the second waveguide flange 5 away from the microwave field reconstructed cavity 1.

The third waveguide flange 7 is provided on one end of the microwave field reconstructed cavity 1 away from the first waveguide flange 3; the fourth waveguide flange 9 is provided at one end of the microwave field reconstructed cavity 1 away from the second waveguide flange 5; the coupling windows 8 are provided between the input port of the third waveguide flange 7 and the microwave field reconstructed cavity 1 as well as between the input port of the fourth waveguide flange 9 and the microwave field reconstructed cavity 1; an external dimension of one end of the third waveguide flange 7 matches an external dimension of the coupling windows 8, and the third waveguide flange 7 is connected to one of the coupling windows 8 by bolts. The coupling windows 8 can be installed on the waveguide flanges with different waveguide lengths. By selecting waveguide of different waveguide lengths, the coupling windows 8 are fixed at different positions, in such a manner that distances between the coupling windows 8 and the short circuit planes are adjusted, thereby adjusting frequencies and characteristics of the resonant cavities formed by the microwave field reconstructed cavity 1.

The input ports 10 are provided at one end of the third waveguide flange 7 and one end of the fourth waveguide flange 9.

Working principles: When using this microwave separated field reconstructed technology, the sample to be processed is first placed inside the microwave field reconstructed cavity 1, and then the first waveguide flange 3 and the second waveguide flange 5 are used to fix the first short circuit plane 4 and the second short circuit plane 6. The coupling windows 8 are fixed by the third waveguide flange 7 and the fourth waveguide flange 9, and then the input ports 10 arranged at two ends of the microwave field reconstructed cavity 1 introduce electric field and magnetic field, so that the electric field and the magnetic field of the microwave are reconstructed at a center position of the microwave field reconstructed cavity 1. Furthermore, the proportion of the reconstructed electric field intensity and magnetic field intensity can be adjusted by adjusting input power of two orthogonal ports. The frequencies and characteristics of the resonant cavities formed by the coupling windows and the short circuit planes can be controlled by installing of the coupling windows 8. The coupling windows 8 can be installed on the waveguide flanges with different waveguide lengths. By selecting waveguide of different waveguide lengths, the coupling windows 8 are fixed at different positions, in such a manner that distances between the coupling windows 8 and the short circuit planes are adjusted, thereby adjusting the frequencies and characteristics of the resonant cavities. Contents not described in this description are well known to those skilled in the art.

Embodiment 2

Figure 4:
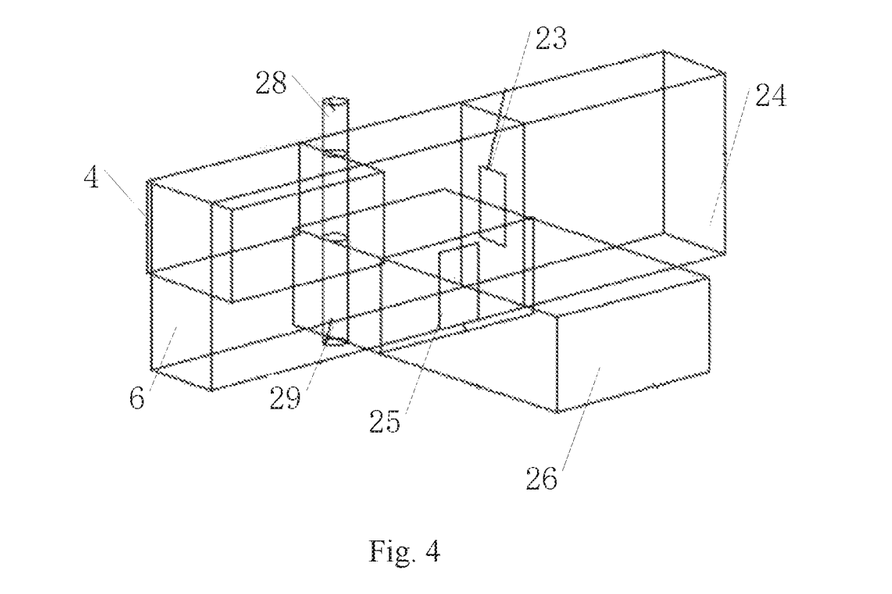
FIG. 4 is a structural view of a microwave chemical reactor based on separated field reconstructed according to an embodiment 2 of the present invention.
Figure 5:
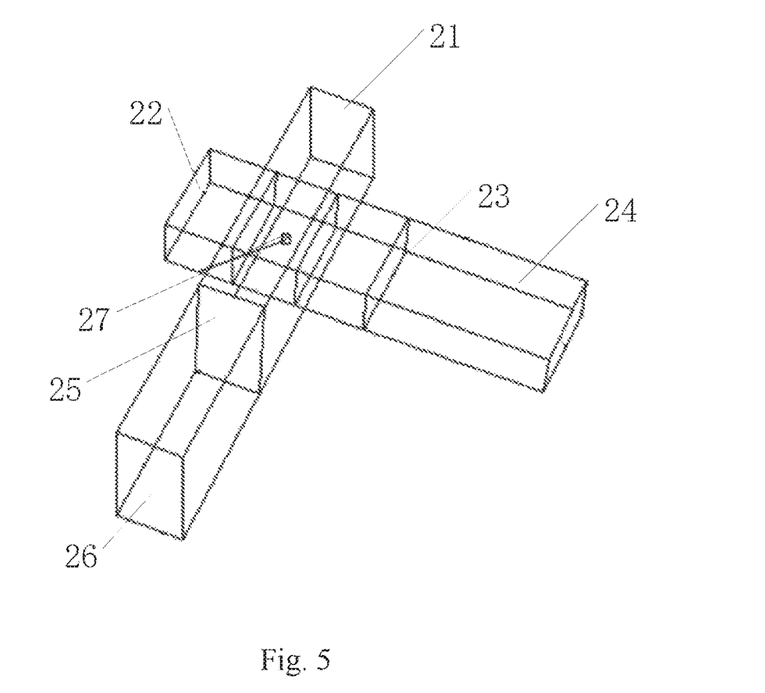
FIG. 5 is a structural view of a separated field reconstructed system of a cross-resonant cavity according to the embodiment 2 of the present invention.

Referring to FIGS. 4-7, the present invention also provides a chemical reactor based on a microwave separated field reconstructed device, wherein in a microwave field reconstructed cavity 1, a cavity between a first short circuit plane 4 and a coupling window 8 connected to a third waveguide flange 7 constitutes a first resonant cavity 22, and a cavity between a second short circuit plane 6 and a coupling window 8 connected to a fourth waveguide flange 9 constitutes a second resonant cavity 21; wherein the chemical reactor further comprises: a second microwave source 24, a first microwave source 26, a treatment sample 27, and a test tube 28, wherein the treatment sample 27 is placed inside the test tube 28;

the second microwave source 24 is connected to an input port of the third waveguide flange 7, and the first microwave source 26 is connected to an input port of the fourth waveguide flange 9; the test tube 28 is inserted into an overlapping part between the second resonant cavity 21 and the first resonant cavity 22.

Preferably, a direction of a width side of a waveguide of the first resonant cavity 22 is parallel to a direction of a narrow side of a waveguide of the second resonant cavity 21, in such a manner that microwave modes of the first resonant cavity 22 and the second resonant cavity 21 are different.

Preferably, the two resonant cavities in the chemical reactor simultaneously enable two electric field centers or two magnetic field centers at the test tube.

Figure 7:
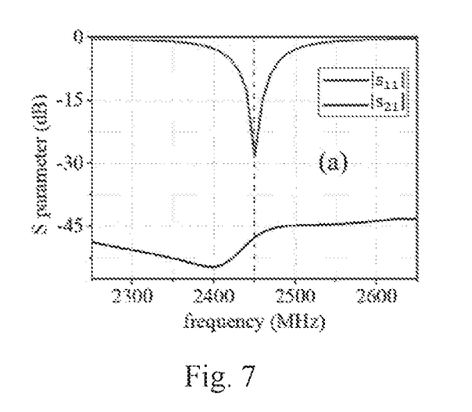
FIG. 7 illustrates an S parameter of the entire system when microwaves are fed to a second resonant cavity separately according to the embodiment 2 of the present invention.

In practice of the present invention, the direction of the width side of the waveguide of the first resonant cavity 22 is parallel to the direction of the narrow side of the waveguide of the second resonant cavity 21, in such a manner that the microwave modes of the first resonant cavity 22 and the second resonant cavity 21 are different. As a result, the two resonant cavities can maintain the field distribution of their own modes to the maximum extent, and coupling between the two resonant cavities is very small. FIG. 7 shows S-parameters of the entire system when microwaves are fed to the second resonant cavity 21 separately. It can be seen that reasonable design of a window form enables good matching of the resonant cavity. At the same time, $|S_{12}|$ of the system is small, indicating that coupling of the system from the second microwave source 24 to the first microwave source 26 is very small; and vice versa.

Figure 6:
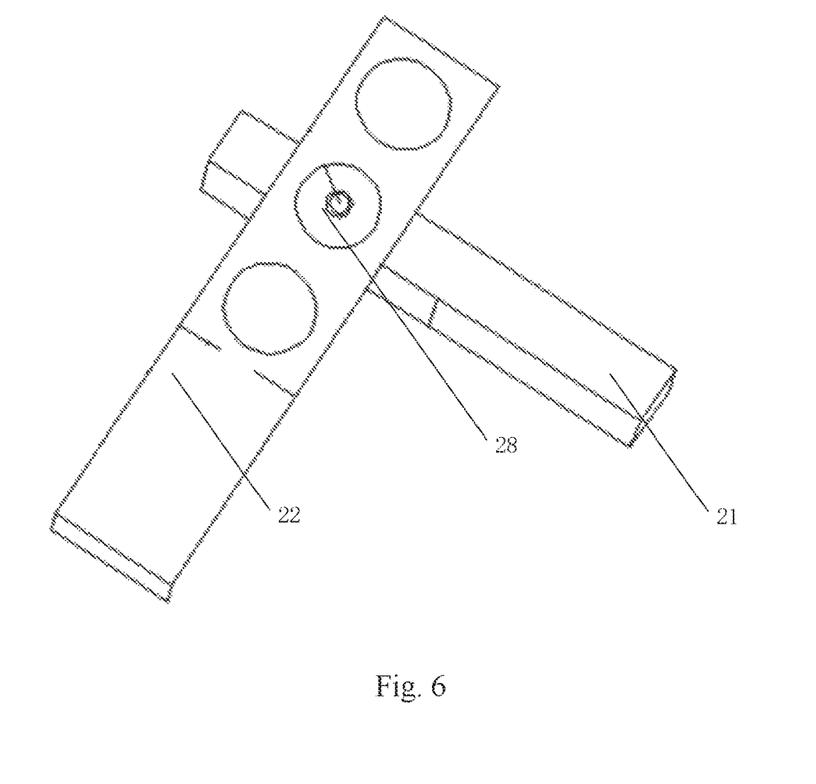
FIG. 6 illustrates electric field distribution in the reactor when a port 1 of the chemical reactor solely feeds according to the embodiment 2 of the present invention.

In addition, FIG. 6 shows field distribution when one of the resonant cavities works in a microwave electric field center and the other works in a microwave magnetic field center, which shows the electric field distribution in the cavity when the second resonant cavity 22 works at the electric field center and is fed separately. It can be seen that the electric field intensity of the microwave is strongest at the test tube position of the reactor, which is an antinode of the electric field. At this time, the magnetic field of the microwave fed from the port 2 in the reaction tube is the smallest, which is close to 0. Therefore, the electric field distribution in the resonant cavity at this time conforms to $TE_{103}$ mode field distribution, and the reaction tube is located at the electric field center in the cavity. At this time, the electric field intensity in the reactant is the strongest, and the magnetic field component of the microwave fed from the port 10 is the weakest and can be almost ignored.

The coupling between the two input ports of the microwave chemical reactor in the present invention is very weak, and a circulator isolator is usually added between the microwave input port of the reactor and the microwave source. Therefore, the two input ports of the reactor will not affect each other. When the two resonant cavities of the reactor are adjusted to place one electric field center and one magnetic field center at the position of the test tube, an arbitrary proportion of electric field and magnetic field components of the microwave in the chemical reaction can be achieved by changing the power fed to the microwave. At the same time, the electric field and magnetic field components of the microwave can be adjusted in real time by adjusting the two microwave sources in real time, so as to feed different proportions of the electric field and magnetic field of the microwave at different stages of the reaction.

When the two resonant cavities of the reactor are separately adjusted to place one electric field center and one magnetic field center at the position of the test tube, since the direction of the width side of the waveguide of the first resonant cavity 22 is parallel to the direction of the narrow side of the waveguide of the second resonant cavity 21, the electric field and the magnetic field components of the microwave in the test tube are parallel. However, in conventional microwave chemical reactors, the electric field and magnetic field components of the microwave are usually perpendicular to each other. If the electric field and the magnetic field components of the microwave of the present invention need to be be perpendicular, the directions of the width side of the two waveguides in the system can also be adjusted to be parallel i.e., rotate one waveguide resonator by 90° in a length direction.

On the other hand, the two resonant cavities in the microwave chemical reactor of the present invention can also be adjusted to simultaneously place two electric field centers or two magnetic field centers at the position of the test tube. In this mode, the microwave electric field or magnetic field in the test tube is in a power synthesis state. Since the directions of the electric magnetic fields of the two input ports are perpendicular in the test tube at this time, the system does not need to be phase-adjusted to achieve high-efficiency power synthesis like conventional coherent power synthesis. In the present invention, the two resonators in the system can be directly adjusted to simultaneously place the electric magnetic field centers at the position of the test tube, thereby performing efficient microwave power synthesis at the position of the test tube.

Embodiment 3

Figure 8:
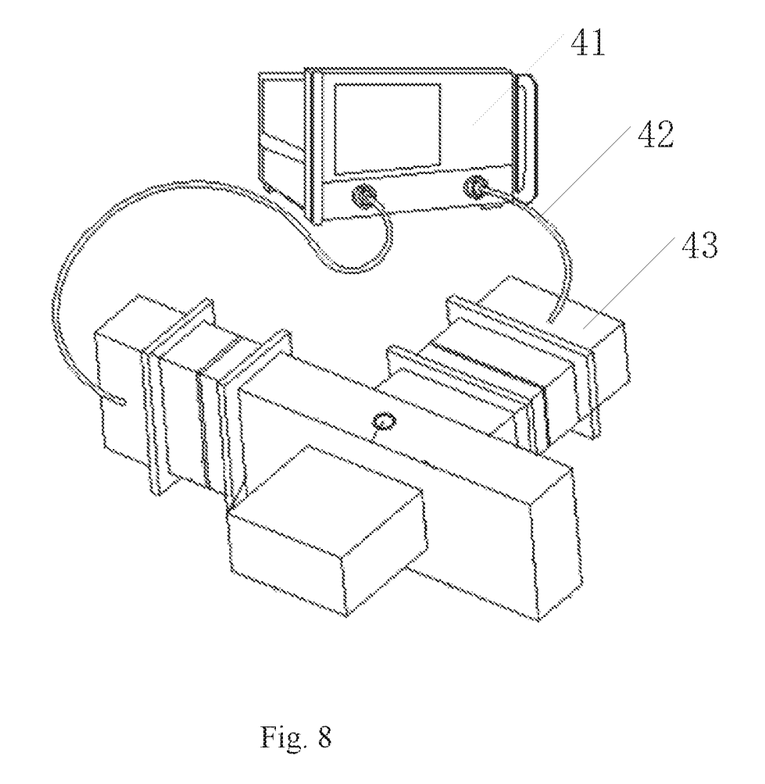
FIG. 8 is a structural view of a separated field reconstructed characteristic system according to an embodiment 3 of the present invention.

Referring to FIG. 8, the present invention also provides a separated field reconstructed characteristic system, comprising: a vector network analyzer 41, coaxial cables 42, waveguide coaxial converters 43, coupling windows, a separated field reconstructed main body, a separated field reconstructed cavity, a mounting slot, a quartz tube and a sample. The coaxial cable 42 is provided at one side of the vector network analyzer 41. The vector network analyzer 41 is electrically connected to the waveguide coaxial converter 43, which is convenient and forms a complete characteristic system. The waveguide coaxial converter 43 is provided on one side of the coaxial cable 42 away from the vector network analyzer 41. There are totally two waveguide coaxial converters 43, and center lines thereof vertically intersect with each other. The coupling window is provided at one side of the waveguide coaxial converter 43 away from the coaxial cable 42. The coupling window is provided between the coupling window and the waveguide coaxial converter 43. Front faces of two coupling window films are connected to the waveguide coaxial converters 43, which directly construct a novel characteristic system for distinguishing permittivity and permeability of materials. The separated field reconstructed main body is provided at the coupling window away from the waveguide coaxial converter 43, which has a "cross" structure and is conducive to establishing an orthogonal mode. The separated field reconstructed main body is formed by two microwave single-mode cavities, wherein fixed-length single-mode cavities are used. S-parameters of the system comprising resonance frequency, values of $|S_{11}|$, $|S_{21}|$, etc. are measured and analyzed to obtain the permittivity and the permeability of the material. Therefore, adjustable short circuit planes and position-adjustable coupling window films are not needed, and the permeability of the material is directly calculated, so as to save calculation time. The separated field reconstructed cavity has the mounting slot in a middle.

The quartz tube is arranged in the mounting slot, wherein an internal dimension of the mounting slot is larger than an external dimension of the quartz tube, and a difference between the internal diameter of the mounting slot and the external diameter of the quartz tube is close to zero. It is very convenient when installing the quartz tube and operation is simple. The sample is placed inside the quartz tube, which is placed at the electric field center and the magnetic field center of the two cavities.

In practice, firstly, the vector network analyzer 41 directly connected to the characteristic system is directly connected to the waveguide coaxial converter 43 through the coaxial cable 42, and the waveguide coaxial converter 43 is connected to the separated field reconstructed main body through the coupling window. The coupling window film corresponds to the waveguide coaxial converter 43. The front faces of the two coupling window films are connected to the waveguide coaxial converters 43. The characteristic system analyzes small signals of the network analyzer 41 to obtain material properties.

Embodiment 4

Figure 9:
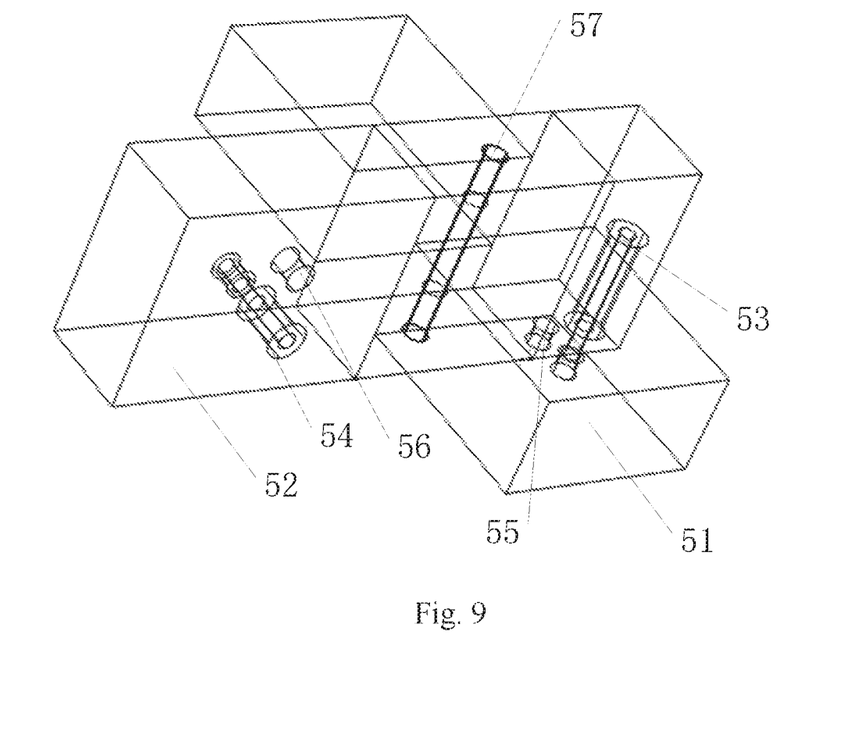
FIG. 9 is a structural view of a chemical reactor according to an embodiment 4 of the present invention.

Referring to FIGS. 1 and 9, the present invention further provides a chemical reactor based on a microwave separated field reconstructed device, comprising: a third short circuit plane 51, a fourth short circuit plane 52, a first coaxial cable 53 and a second coaxial cable 54, wherein the third short circuit plane 51 is directly connected to the microwave field reconstructed cavity 1; the fourth short circuit plane 52 is directly connected to the microwave field reconstructed cavity 1; the chemical reactor further comprises assembly holes arranged on the microwave field reconstructed cavity 1 for installing test tubes.

The first coaxial cable 53 is installed on the third short circuit plane 51; the second coaxial cable 54 is installed on the fourth short circuit plane 52.

Preferably, the embodiment 4 further comprises a first tuner 55 and a second tuner 56, wherein the first tuner 55 helps to match the field reconstructed device and the first coaxial cable 53, and the second tuner 56 helps to match the field reconstructed device and the second coaxial cable 53.

Preferably, in the embodiment 4, both the first coaxial cable and the second coaxial cable 54 are externally connected to a microwave source.

In practice, the test tube is placed on the assembling hole 57, and then the first to coaxial cable 53 and the second coaxial cable 54 are connected to the microwave source. The first tuner 55 and the second tuner 56 help to match the field reconstructed device and the coaxial cables, thereby microwave-processing the test sample in the test tube.

For persons of ordinary skill in the art, equivalent replacements or changes can be made according to the technical solution and inventive concept of the present invention, and all these changes or replacements should fall within the protection scope of the claims of the present invention.

What is claimed is:

1. A characteristic system, comprising: a vector network analyzer (41), two coaxial cables (42), and a microwave separated field reconstructed device;

wherein the microwave separated field reconstructed device comprises: a microwave field reconstructed cavity (1), a first short circuit plane (4), a third waveguide flange (7) and coupling windows (8), wherein connection ports (2) are provided on four ends of the microwave field reconstructed cavity (1); the microwave field reconstructed cavity (1) is provided with a first waveguide flange (3), and a second waveguide flange (5) is provided one end of the microwave field reconstructed cavity (1) perpendicular to the first waveguide flange (3); the first short circuit plane (4) is connected to one end of the first waveguide flange (3) away from the microwave field reconstructed cavity (1); a second short circuit plane (6) is connected to one end of the second waveguide flange (5) away from the microwave field reconstructed cavity (1); a third waveguide flange (7) is provided on one end of the microwave field reconstructed cavity (1) away from the first waveguide flange (3); a fourth waveguide flange (9) is provided at one end of the microwave field reconstructed cavity (1) away from the second waveguide flange (5); input ports (10) are provided at one end of the third waveguide flange (7) and one end of the fourth waveguide flange (9); the coupling windows (8) are provided between the input port of third waveguide flange (7) and the microwave field reconstructed cavity (1) as well as between the input port of the fourth waveguide flange (9) and the microwave field reconstructed cavity (1); the two waveguide coaxial converters are connected to the input port of the fourth waveguide flange (9) and the input port of the third waveguide flange (7), respectively; the two coaxial cables (42) are respectively connected to two waveguide coaxial converters (43), and both are connected to the vector network analyzer (41).

2. The characteristic system, as recited in claim 1, wherein the vector network analyzer (41) is electrically connected to the two waveguide coaxial converters (43) through the two coaxial cables (42).

3. The characteristic system, as recited in claim 1, wherein the microwave separated field reconstructed device further comprises a third short circuit plane (51) and a fourth short circuit plane (52), wherein each of the third short circuit plane (51) and the fourth short circuit plane (52) has a port for connection of the coaxial cable, so as to be connected to the connection ports (2) of the microwave field reconstructed cavity (1).

* * * * *